(12) United States Patent
Wilson

(10) Patent No.: US 7,082,818 B2
(45) Date of Patent: Aug. 1, 2006

(54) TIRE MONITORING DEVICE WITH COUPLED POWER SOURCE

(75) Inventor: Paul B. Wilson, Tallmadge, OH (US)

(73) Assignee: Bridgestone Firestone North American Tire, LLC, Nashville, TN (US)

(*) Notice: Subject to any disclaimer, the term of this patent is extended or adjusted under 35 U.S.C. 154(b) by 346 days.

(21) Appl. No.: 10/055,324

(22) Filed: Jan. 22, 2002

(65) Prior Publication Data

US 2002/0066506 A1 Jun. 6, 2002

Related U.S. Application Data

(63) Continuation of application No. 09/522,431, filed on Mar. 9, 2000, now Pat. No. 6,371,178.

(51) Int. Cl.
 *B60C 23/04* (2006.01)
(52) U.S. Cl. .................... 73/146.5; 152/152.1
(58) Field of Classification Search ............ 73/146, 73/146.5, 146.2, 146.3, 146.4, 146.8; 340/443, 340/447, 445, 442; 152/152.1
See application file for complete search history.

(56) References Cited

U.S. PATENT DOCUMENTS

| | | | |
|---|---|---|---|
| 6,175,301 B1* | 1/2001 | Piesinger | 340/442 |
| 6,208,244 B1 | 3/2001 | Wilson | |
| 6,243,007 B1* | 6/2001 | McLaughlin et al. | 340/447 |
| 6,255,940 B1* | 7/2001 | Phelan et al. | 340/447 |
| 6,259,360 B1* | 7/2001 | Takamura | 340/445 |
| 6,371,178 B1* | 4/2002 | Wilson | 152/152.1 |
| 6,388,567 B1* | 5/2002 | Bohm et al. | 340/442 |
| 6,653,936 B1* | 11/2003 | Bohm et al. | 340/442 |
| 6,705,365 B1* | 3/2004 | Wilson | 152/152.1 |
| 2002/0093421 A1* | 7/2002 | Bohm et al. | 340/442 |
| 2002/0174925 A1* | 11/2002 | Wilson et al. | 152/415 |
| 2004/0046649 A1* | 3/2004 | Sanchez et al. | 340/443 |
| 2004/0189455 A1* | 9/2004 | Wilson et al. | 340/442 |
| 2005/0046559 A1* | 3/2005 | Kulha | 340/445 |
| 2005/0092076 A1* | 5/2005 | Uleski et al. | 73/146.8 |
| 2005/0099274 A1* | 5/2005 | Tranchina | 340/426.15 |

* cited by examiner

*Primary Examiner*—Max Noori
*Assistant Examiner*—Andre Allen
(74) *Attorney, Agent, or Firm*—Fred H. Zollinger, III

(57) ABSTRACT

A method and apparatus for connecting an electronic monitoring device to a pneumatic tire includes mounting the monitoring package of the monitoring device within the body of the tire or the body of a patch and subsequently connecting the power source to the monitoring package through electrical coupling. The method allows the monitoring package to be cured within the tire or the patch at relatively high temperatures while protecting the sensitive power source from the high temperatures. The use of electrical coupling to achieve the power transfer prevents the material surrounding the monitoring package from being pierced by an element that would form the direct electrical connection. The method allows the monitoring package and its antenna to be positioned in a variety of positions on or within the pneumatic tire.

26 Claims, 4 Drawing Sheets

TIRE MONITORING DEVICE WITH COUPLED POWER SOURCE

CROSS-REFERENCE TO RELATED APPLICATIONS

This application is a continuation application of currently U.S. patent application, Ser. No. 09/522,431, filed Mar. 9, 2000, now U.S. Pat. No. 6,371,178 the disclosures of which are incorporated herein by reference.

BACKGROUND OF THE INVENTION

1. Technical Field

This invention generally relates to monitoring devices that monitor engineering conditions of pneumatic tires and, more particularly, to an apparatus and method for connecting the power supply to an electronic monitoring device mounted in a pneumatic tire. Specifically, the present invention relates to an apparatus and method for supplying power to the components of an active monitoring device after the components are mounted or cured into a pneumatic tire or mounted or cured into a patch that is then connected to a pneumatic tire.

2. Background Information

Monitoring engineering conditions of pneumatic tires is becoming increasingly desired by tire consumers who use expensive tires or who place large amounts of miles on the tires. The monitoring is preferably performed while the tires are in use on the vehicle without requiring the tires to be removed, the vehicle slowed, the tires specially positioned, or having a person position a reader in a special position to take the measurement.

Numerous types of monitoring devices are known in the art for performing these measurements. For instance, the monitoring device may include a pressure sensor and a temperature sensor connected to a controller having various timers, storage devices, and transmitters/receivers. The data created by the pressure sensor or temperature sensor may be stored in the storage device and later transmitted out of the tire with an antenna by the transmitter. Other types of monitoring devices may be positioned primarily outside the tire and connected to a pressure or temperature sensor through the tire's valve stem. Still other types of monitoring devices use a passive circuit embedded within the tire that is energized by inductive magnetic coupling. Further examples of monitoring devices are disclosed in U.S. Pat. Nos. 5,573,610, 5,573,611, and 5,562,787.

Active, self-powered monitoring devices use an antenna to transmit data from the monitoring device to a data gathering device positioned outside of the tire. One of the problems in the art is to position the antenna in the tire such that data are accurately and reliably transmitted to the data gathering device. Positioning the antenna close to the outside of the tire minimizes the amount of material through which the transmissions must pass before exiting the tire. One of the more desirable antenna positions is thus to have the antenna embedded within the tire sidewall or within a patch directly connected to the tire sidewall. The bead ring and apex filler tend to interfere with transmissions and a desirable antenna position locates the antenna above these items. Unfortunately, the areas of the tire adjacent the bead ring and the apex filler are low flex areas which are desirable mounting positions for the other components of the monitoring device. The art thus desires an invention that accommodates both positions.

One method of anchoring the components of the monitoring device within a pneumatic tire is to cure the monitoring device within the body of the tire. The components may also be cured within a patch that is connected to the innerliner. A significant problem with curing these elements in the body of a tire or the body of a patch is that the battery or power source used to supply power to the monitoring device is easily damaged or destroyed by the heat of the curing process. The risk of damage to the battery has prevented self-powered electronic monitoring devices from being embedded within a green tire and then cured into the tire during the green tire cure process. The damage to the battery is especially unfortunate because positioning the antenna and the monitoring device components within the tire body or within the body of a patch allows the components and antenna to be ideally positioned and secured for use within the tire. The art thus desires an apparatus and method for connecting the monitoring device to the tire by curing the components of the monitoring device within the body of the tire or the body of a patch and then subsequently connecting the battery to the components.

BRIEF SUMMARY OF THE INVENTION

In view of the foregoing, the present invention provides a method of providing electrical power to a monitoring device mounted on a patch or on a pneumatic tire. The invention provides the electrical power by coupling the power source to the monitoring device such that a direct physical connection between the two elements is not required. The lack of the direct physical connection allows the monitoring device elements to be cured within the tire or the patch at relatively high temperatures and adding the power source later without penetrating any of the material surrounding the monitoring device elements. The invention thus provides multiple positions for mounting the monitoring device while protecting the integrity of the power source.

The invention also provides a monitoring device arrangement inside a pneumatic tire wherein the power source may be readily replaced without moving the other elements of the monitoring device.

The invention thus provides a combination of a pneumatic tire having a body and a monitoring device having a monitoring package; a power source; a first coupling element; and a second coupling element. The first coupling element is connected to the power source. A second coupling element is connected to the monitoring package. The monitoring device and the power source are mounted to the pneumatic tire in a position where the first and second coupling elements are aligned and spaced apart whereby power is supplied to the monitoring package from the power source by electrical coupling.

The invention also provides a method of mounting an electronic monitoring package to a pneumatic tire. The method includes the steps of providing a pneumatic tire having a body and providing a power source having a first coupling element connected to the power source. An electronic monitoring package is then provided having a second coupling element connected to the electronic monitoring package. The electronic monitoring package is mounted to the pneumatic tire and the power source is mounted to the pneumatic tire in a position where the first and second coupling elements are spaced apart and aligned to provide power from the power source to the monitoring package through electrical coupling.

The invention also includes a method of mounting an electronic monitoring package to a patch. The method includes the steps of providing a patch and providing a power source having a first coupling element connected to the power source. An electronic monitoring package having a second coupling element connected to the electronic monitoring package is then provided. The electronic monitoring package is mounted to the patch and the power source is mounted to the patch in a position where the first and second coupling elements are spaced apart and aligned to provide power from the power source to the monitoring package through electrical coupling.

BRIEF DESCRIPTION OF THE SEVERAL VIEWS OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended claims.

Similar numbers refer to similar parts throughout the specification.

DETAILED DESCRIPTION OF THE INVENTION

Figure 1:
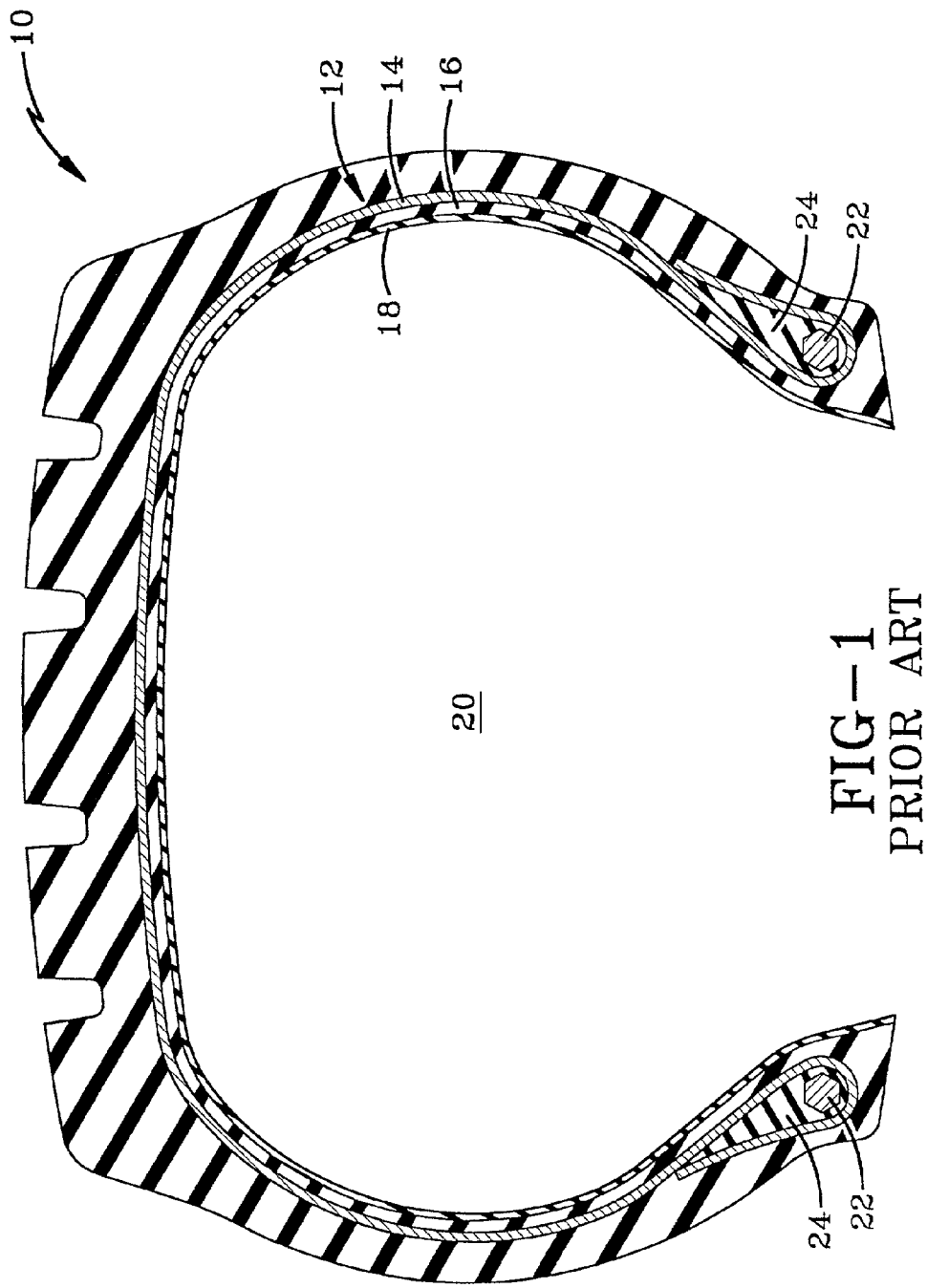
FIG. 1 is a sectional view of a typical prior art pneumatic tire.

A typical prior art pneumatic tire is depicted in FIG. 1 and is indicated generally by the numeral 10. Tire 10 includes a body 12 that includes a reinforcing cord ply 14, at least one body ply 16, and an innerliner 18. Innerliner 18 includes an outer surface that faces the chamber 20 formed when tire 10 is mounted on a rim (not shown). Tire 10 also includes a pair of bead rings 22 and a pair of apex fillers 24.

Figure 2:
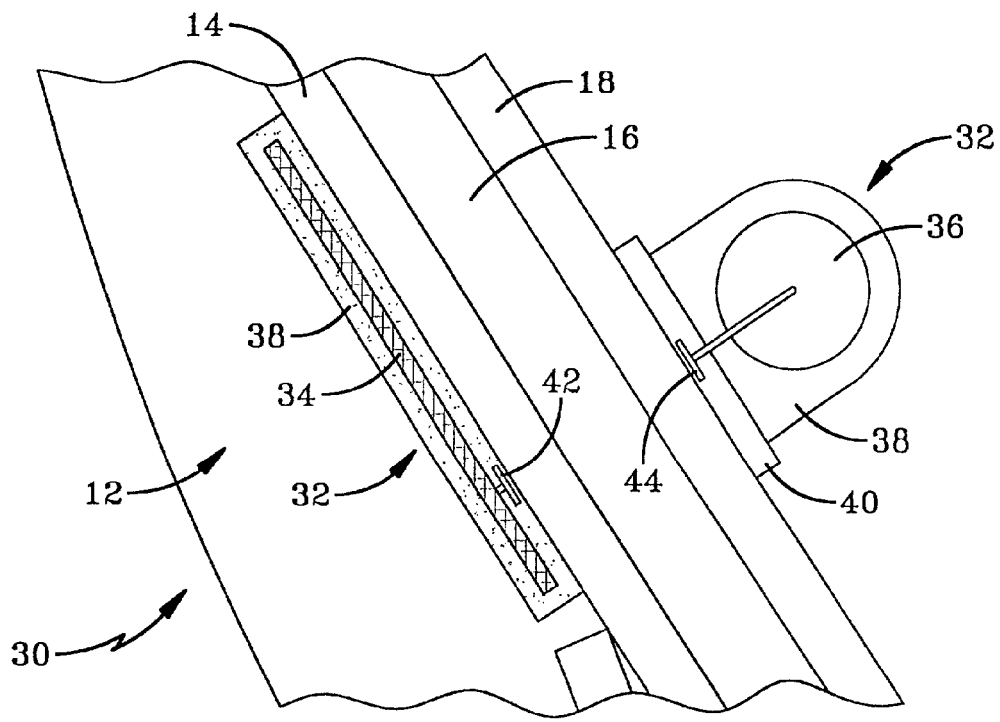
FIG. 2 is an enlarged sectional view of a portion of a tire sidewall wherein a monitoring device is mounted according to the concepts of the present invention.

The first embodiment of the invention is depicted in FIG. 2 with the pneumatic tire indicated generally by the numeral 30. Tire 30 includes many of the same body elements as tire 10 but further includes an electronic monitoring device 32 mounted to pneumatic tire 30. Electronic monitoring device 32 includes a monitoring package 34 mounted within body 12 and a power source 36 mounted to innerliner 18. Monitoring package 34 receives power from power source 36 through electrical coupling. Specifically, monitoring package 34 receives power through close proximity electromagnetic coupling.

Electronic monitoring package 34 may include a variety of components that are known in the art to monitor at least one engineering condition of pneumatic tire 30 and transmit information out of tire 30. Electronic monitoring package 34 may include at least one sensing element that monitors or measures an engineering condition of tire 30. Monitoring package 34 may further include a device to store the information or data gathered by the sensor, a CPU, a transmitter/receiver, and an antenna. Any of a variety of known combinations of these elements may be present in monitoring package 34 for gathering data and transmitting data out of tire 30. In the preferred embodiment, monitoring package 34 is encapsulated with an encapsulation material 38 to protect monitoring package 34. Encapsulation material 38 may be any of a variety of encapsulation materials known in the art such as epoxies.

Power source 36 is also preferably encapsulated with an encapsulation material 38. In the preferred embodiment of the invention, power source 36 is mounted to a patch 40 that mounts power source 36 to innerliner 18. In other embodiments, power source 36 may be mounted directly to innerliner 18 without the use of patch 40.

Power source 36 is preferably in the form of a battery. The battery may be any of a variety of batteries known in the art for providing power to devices such monitoring package 34. The battery preferably has a long life and is able to survive in the environment inside a pneumatic tire. Power source 36 may also include electronics to increase the voltage that is supplied to coupling elements thereby increasing the electric field strength.

In accordance with the present invention, power source 36 is in communication with monitoring package 34 through a non-direct connection. Power source 36 is coupled to monitoring package 34 through first and second coupling elements 42 and 44. Coupling elements 42 and 44 may be coils, pads, plates, or any of a variety of other arrangements known in the art for providing field coupling between aligned and spaced elements. First coupling element 42 is in direct electrical communication with monitoring package 34 and second coupling element 44 is in direct electrical communication with power source 36. Coupling elements 42 and 44 are arranged to be aligned and spaced apart such that power may be transferred from power source 36 to monitoring package 34. The power transfer occurs because first coupling element 42 is placed in the field created by second coupling element 44. A position of first coupling element 42 within the field of second coupling element 44 induces a current in second element 42 to transfer the power from power source 36 to monitoring package 34.

In the embodiment of the invention depicted in FIG. 2, tire 30 is manufactured by inserting monitoring package 34 into body 12 when body 12 is being assembled. Monitoring package 34 is positioned such that body cords 14 are disposed between monitoring package 34 and the interior body ply 16. Monitoring package 34 is placed in this position before body 12 is cured preferably at the green tire stage. Monitoring package 34 is then cured within body 12 when the green tire is cured. After body 12 is cured, power source 36 is connected to innerliner 18 such that first and second coupling elements 42 and 44 are aligned. The alignment that is required is an alignment that allows the first and second coupling elements 42 and 44 to communicate with each other and to transfer power from power source 36 to monitoring package 34. In the embodiment depicted in FIG. 2, coupling elements 42 and 44 are disposed directly across from each other through reinforcing cord ply 14, body ply 16, and innerliner 18.

Mounting monitoring package 34 and power source 36 in this manner allows power source 36 to be readily replaced without changing the position of monitoring package 34. This method also allows monitoring package 34 to be positioned in a desired location within tire 30. The use of coupling elements 42 and 44 allow monitoring package 34 to be cured within tire 30.

Figure 3:
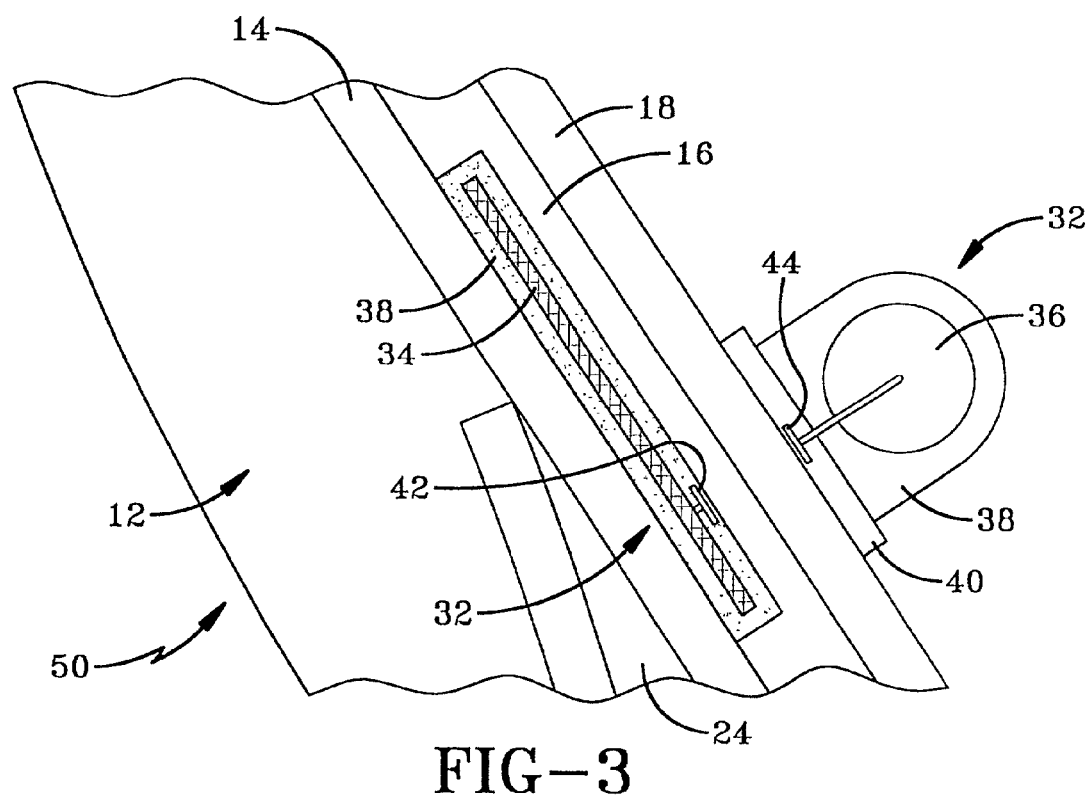
FIG. 3 is a view similar to FIG. 2 showing a monitoring device mounted in another position.

An alternative embodiment of the invention is depicted in FIG. 3 with the tire indicated generally by the numeral 50. Monitoring device 32 is positioned in a different position in tire 50 than in tire 30. In tire 50, monitoring package 34 is positioned between reinforcing cord ply 14 and body ply 16. The arrangement of coupling elements 42 and 44 remains the same as described above and the method of building tire 50 is substantially the same as described above.

Figure 4:
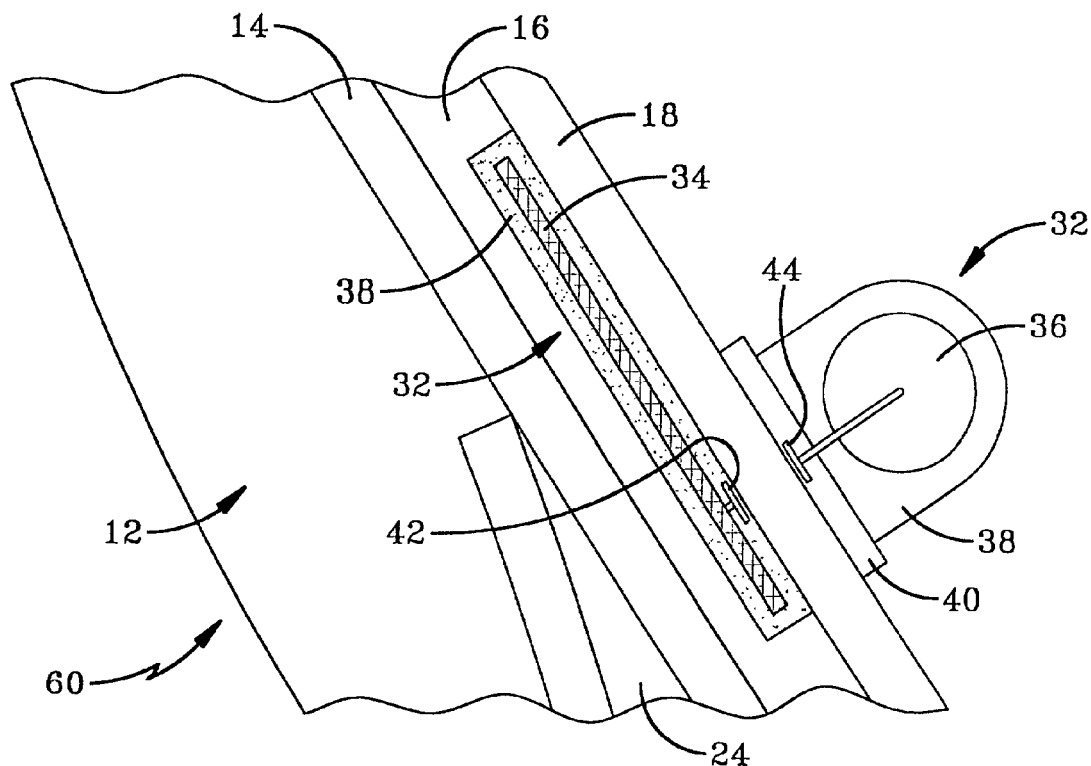
FIG. 4 is a view similar to FIG. 2 showing a monitoring device mounted in a different position.
Figure 5:
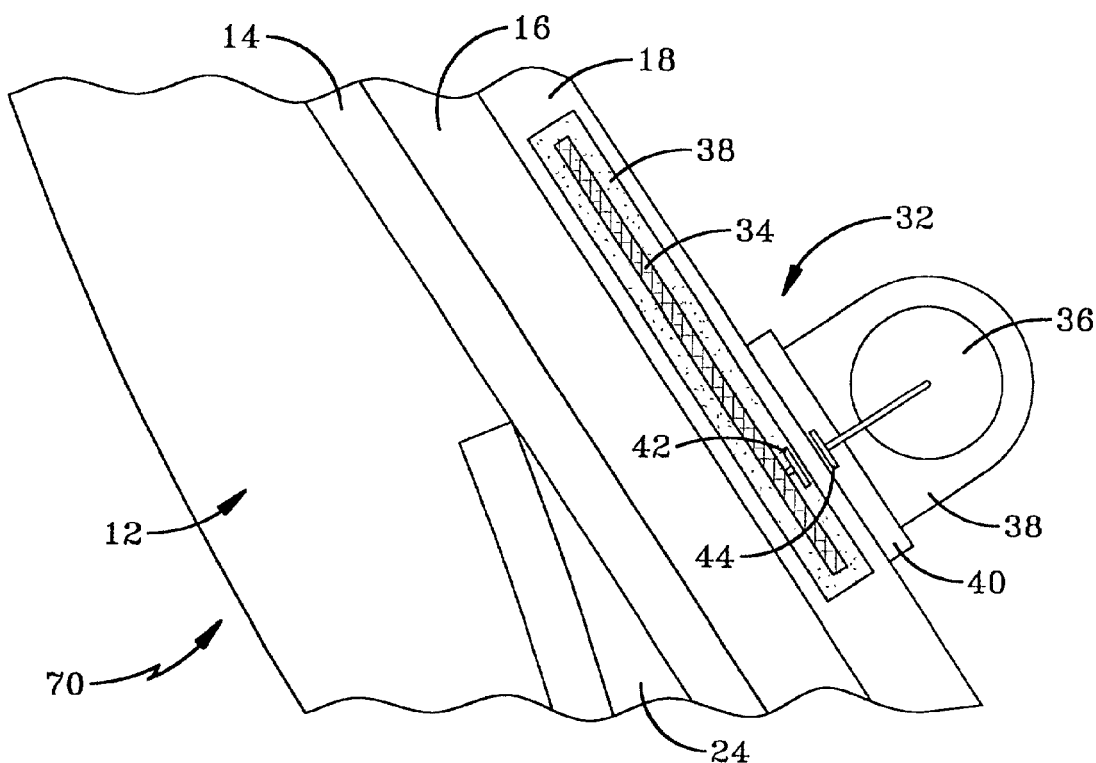
FIG. 5 is a view similar to FIG. 2 showing a monitoring device mounted in a different position.
Figure 6:
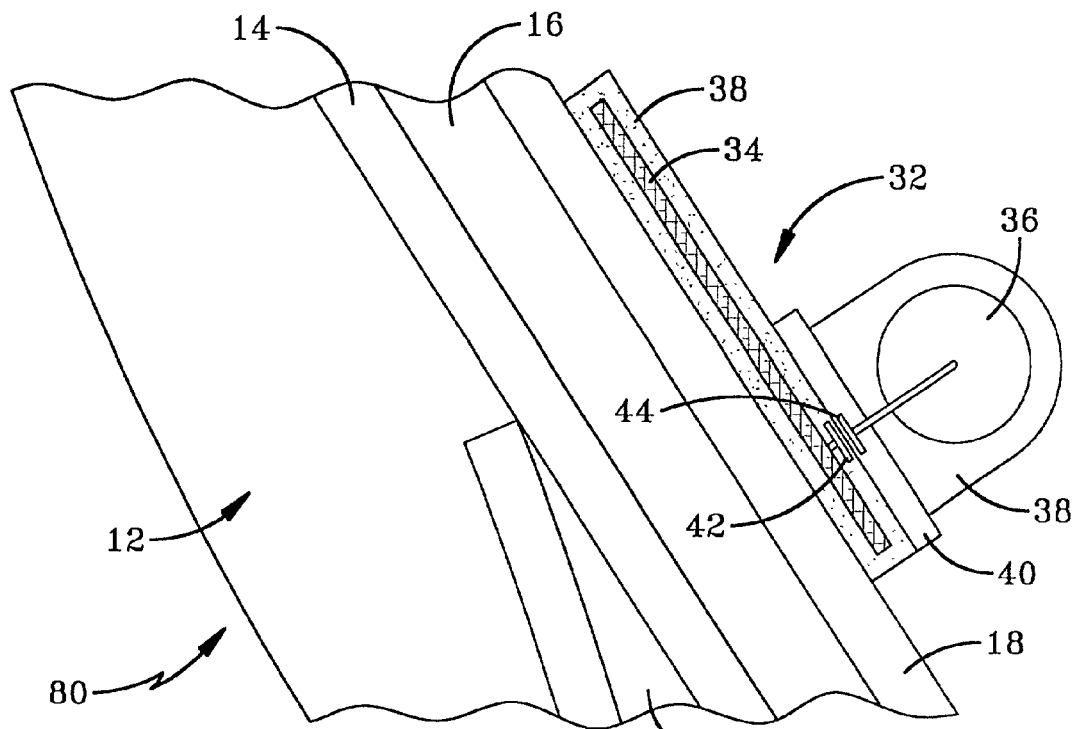
FIG. 6 is a view similar to FIG. 2 showing the monitoring device mounted directly to the surface of the innerliner of the pneumatic tire.

Tire embodiment 60 is depicted in FIG. 4 with monitoring package 34 positioned between body ply 16 and innerliner 18. Tire 70 of FIG. 5 shows monitoring package 34 embedded within innerliner 18. Tire 80 of FIG. 6 depicts an embodiment where monitoring package 34 is mounted to the inner surface of innerliner 18. In each of the embodiments of FIGS. 4, 5, and 6, first and second coupling elements 42 and 44 are aligned and spaced apart to provide power between power source 36 and monitoring package 34.

Figure 7:
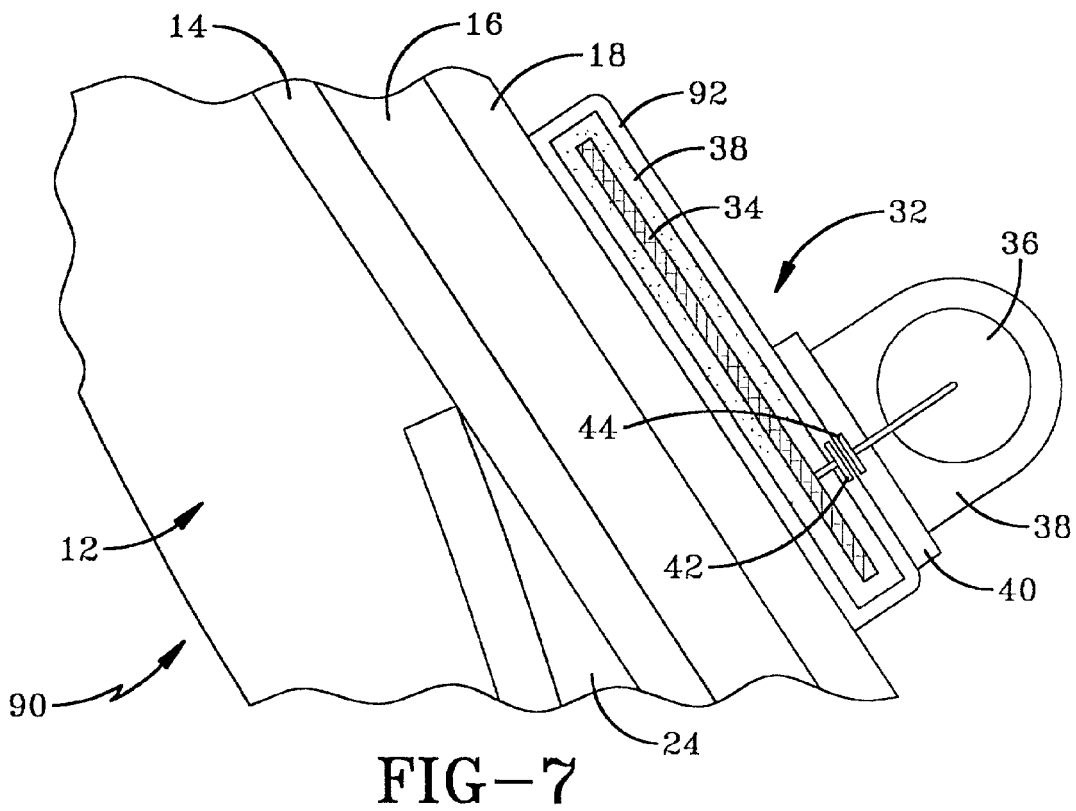
FIG. 7 is a view similar to FIG. 2 showing the use of a patch to mount the monitoring device to the innerliner of the tire.

Tire 90 is depicted in FIG. 7 with monitoring package 34 embedded within a patch 92 connected to innerliner 18. Patch 92 may be a rubber patch that is fabricated separately from body 12 of tire 90 and later connected to innerliner 18. In another embodiment, patch 92 is an anchoring patch that is connected to innerliner 18 before body 12 of tire 90 is cured. The green tire curing process cures body 12 and anchoring patch 92 along with monitoring device 34 embedded within anchoring patch 92. The apparatus and method of using anchoring patch 92 is disclosed and described in U.S. patent applications Ser. Nos. 09/205,931 and 09/206,273, filed Dec. 4, 1998, which are owned by the Assignee of the present application. In the other embodiment where patch 92 is an attachment patch, patch 92 is fabricated and cured separate from body 12. In this embodiment, monitoring package 34 is connected to attachment patch 92 or embedded within attachment patch 92 before patch 92 is cured. Power source 36 may be attached to patch 92 before patch 92 is connected to innerliner 18 or after patch 92 is connected to innerliner 18.

Accordingly, the improved method of providing electrical power to an embedded electronic device in a tire using close proximity electromagnetic coupling apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the method of providing electrical power to an embedded electronic device in a tire using close proximity electromagnetic coupling is constructed and used, the characteristics of the construction, and the advantageous new and useful results obtained; the new and useful structures, devices, elements, arrangements, parts, and combinations are set forth in the appended claims.

The invention claimed is:

1. A monitoring device for monitoring conditions in a pneumatic tire; the device comprising:
    a tire monitoring package, a power source, a first coupling element, and a second coupling element;
    the first coupling element connected to the power source;
    the second coupling element connected to the tire monitoring package; and
    the first and second coupling elements being aligned and spaced apart whereby power is supplied to the tire monitoring package from the power source.

2. The device of claim 1, further comprising an attachment patch; the monitoring package being connected to the attachment patch.

3. The device of claim 2, wherein the monitoring package is connected to the outer surface of the attachment patch.

4. The device of claim 3, further comprising a patch connected to the power source; the patch connecting the power source to the attachment patch.

5. The device of claim 2, wherein the monitoring package is embedded within the body of the attachment patch.

6. The device of claim 5, further comprising a patch connected to the power source; the patch connecting the power source to the attachment patch.

7. The device of claim 1, wherein the first and second coupling elements are coils.

8. The device of claim 1, wherein the first and second coupling elements are pads.

9. A monitoring device for monitoring conditions in a pneumatic tire; the device comprising:
    a tire monitoring package and a power source;
    the power source being electrically coupled to the monitoring package to provide power to the tire monitoring package;
    a first coupling element electrically connected to the monitoring package;
    a second coupling element electrically connected to the power source; and
    the first and second coupling elements being aligned and spaced apart whereby power is supplied to the tire monitoring package from the power source through electrical coupling.

10. The device of claim 9, wherein the first and second coupling elements are coils.

11. The device of claim 9, wherein the first and second coupling elements are pads.

12. A monitoring device for monitoring conditions in a pneumatic tire; the device comprising:
    a tire monitoring package and a power source;
    the power source being electrically coupled to the tire monitoring package through electrical field coupling to provide power to the monitoring package;
    an attachment patch; the monitoring package being connected to the attachment patch;
    the monitoring package being connected to the outer surface of the attachment patch; and
    a patch connected to the power source; the patch connecting the power source to the attachment patch.

13. The device of claim 12, further comprising a first coupling element electrically connected to the monitoring package;
    a second coupling element electrically connected to the power source; and
    the first and second coupling elements being aligned and spaced apart whereby power is supplied to the monitoring package from the power source through electrical coupling.

14. The device of claim 13, wherein the first and second coupling elements are coils.

15. The device of claim 13, wherein the first and second coupling elements are pads.

16. The device of claim 12, wherein the power source is a battery.

17. A monitoring device for monitoring conditions in a tire pneumatic tire; the device comprising:
- a tire monitoring package and a power source
- the power source being electrically coupled to the tire monitoring package through electrical field coupling to provide power to the tire monitoring package;
- an attachment patch; the monitoring package being connected to the attachment patch; and
- the monitoring package being embedded within the body of the attachment patch.

18. The device of claim 17, further comprising a patch connected to the power source; the patch connecting the power source to the attachment patch.

19. The device of claim 17, further comprising a first coupling element electrically connected to the monitoring package;
- a second coupling element electrically connected to the power source; and
- the first and second coupling elements being aligned and spaced apart whereby power is supplied to the monitoring package from the power source through electrical coupling.

20. The device of claim 19, wherein the first and second coupling elements are coils.

21. The device of claim 19, wherein the first and second coupling elements are pads.

22. A monitoring device for monitoring conditions in a tire pneumatic tire; the device comprising:
- a tire monitoring package and a power source; and
- the power source being electrically connected to the tire monitoring package through close proximity electromagnetic coupling to provide power to the monitoring package the first and second coupling elements being aligned and spaced apart whereby power is supplied to the tire monitoring package from the power source through electrical coupling.

23. The device of claim 22, further comprising an attachment patch; the monitoring package being connected to the attachment patch.

24. The device of claim 23, wherein the monitoring package is connected to the outer surface of the attachment patch.

25. The device of claim 22, wherein the first and second coupling elements are coils.

26. The device of claim 22, wherein the first and second coupling elements are pads.

* * * * *